(12) United States Patent
Vukich et al.

(10) Patent No.: US 11,425,080 B2
(45) Date of Patent: Aug. 23, 2022

(54) COMPUTER-IMPLEMENTED SYSTEMS CONFIGURED FOR AUTOMATED MACHINE LEARNING CONTACT PRIORITY PREDICTION FOR ELECTRONIC MESSAGES AND METHODS OF USE THEREOF

(71) Applicant: Capital One Services, LLC, McLean, VA (US)

(72) Inventors: Adam Vukich, Alexandria, VA (US); George Bergeron, Falls Church, VA (US); James Zarakas, Cenlreville, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/323,497

(22) Filed: May 18, 2021

(65) Prior Publication Data
US 2021/0344635 A1 Nov. 4, 2021

Related U.S. Application Data

(63) Continuation of application No. 16/863,721, filed on Apr. 30, 2020, now Pat. No. 11,082,387.

(51) Int. Cl.
*H04L 51/226* (2022.01)
*G06N 20/00* (2019.01)
(Continued)

(52) U.S. Cl.
CPC ........... *H04L 51/226* (2022.05); *G06N 20/00* (2019.01); *H04L 51/224* (2022.05); *H04L 51/42* (2022.05)

(58) Field of Classification Search
CPC ......... H04L 51/26; H04L 51/22; H04L 51/24; H04L 51/18; G06N 20/00
See application file for complete search history.

(56) References Cited

U.S. PATENT DOCUMENTS 9,882,853 B1 1/2018 Zlatnik et al.
10,432,776 B1 10/2019 Jain et al.
(Continued)

FOREIGN PATENT DOCUMENTS

CN 110192211 A * 8/2019 ......... G06F 3/04817

*Primary Examiner* — Oanh Duong
(74) *Attorney, Agent, or Firm* — Greenberg Traurig, LLP

(57) ABSTRACT

In order to facilitate automatic message prioritization, systems and methods are described including a processor that receives electronic messages, where each electronic message is associated with a sender and a recipient. The processor utilizes a message prioritization machine learning model to predict a current prioritized ordering of the electronic messages based on parameters associated with each electronic message, where the parameters include a calendar event parameter representing a calendar event associated with each electronic message, a personnel parameter associated with the sender of each electronic message, and a message subject parameter associated with a subject of each electronic message, where the current prioritized ordering includes an order of notification of each electronic message according to priority based on an interaction history of historical electronic messages associated with the sender The processor causes to display the electronic messages according to the current prioritized ordering.

20 Claims, 8 Drawing Sheets

(51) Int. Cl.
    *H04L 51/42*          (2022.01)
    *H04L 51/224*       (2022.01)

(56) References Cited

U.S. PATENT DOCUMENTS

| | | |
|---|---|---|
| 2008/0228548 A1 | 9/2008 | McBearty et al. |
| 2013/0124648 A1 | 5/2013 | Kallayil et al. |
| 2015/0350146 A1 | 12/2015 | Cary et al. |
| 2017/0126610 A1 | 5/2017 | Sachidanandam et al. |
| 2018/0046929 A1 | 2/2018 | Xuan |
| 2018/0048595 A1 | 2/2018 | Dotan-Cohen et al. |
| 2018/0107985 A1* | 4/2018 | Ramesan ................ H04L 51/18 |
| 2018/0107986 A1 | 4/2018 | Ramesan et al. |
| 2018/0253659 A1 | 9/2018 | Lee et al. |
| 2018/0309708 A1 | 10/2018 | Potvin |
| 2020/0005247 A1* | 1/2020 | Randall ................ G06Q 40/10 |
| 2020/0125424 A1* | 4/2020 | Subedi ................ G06N 20/00 |

* cited by examiner ized ordering on a screen of at least one computing
device associated with the recipient.

COMPUTER-IMPLEMENTED SYSTEMS CONFIGURED FOR AUTOMATED MACHINE LEARNING CONTACT PRIORITY PREDICTION FOR ELECTRONIC MESSAGES AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Service, LLC, All Rights Reserved.

FIELD OF TECHNOLOGY

The present disclosure generally relates to improved computer-based systems devices, components and objects configured for automated contact priority prediction for electronic messaging and methods of use thereof.

BACKGROUND OF TECHNOLOGY

A computer network platform/system may include a group of computers (e.g., clients, servers, smart routers) and other computing hardware devices that are linked together through one or more communication channels to facilitate communication or resource-sharing, via one or more specifically programmed graphical user interfaces (GUIs), among a wide range of users.

SUMMARY OF DESCRIBED SUBJECT MATTER

In some embodiments, the present disclosure provides an exemplary computer-based method that includes at least the following steps of accessing, by at least one processor, a plurality of electronic messages residing in an electronic inbox associated with a recipient, wherein the plurality of electronic messages are associated with at least one sender; utilizing, by the at least one processor, a message prioritization machine learning model to predict a current prioritized ordering of the plurality of electronic messages based at least in part on a plurality of parameters associated with each of the plurality of electronic messages; wherein the plurality of parameters comprise: i) at least one calendar event parameter that represents a calendar event associated with a respective electronic message, ii) at least one personnel parameter associated with the sender of the respective electronic message, and iii) at least one message subject parameter associated with a subject of the respective electronic message; wherein the current prioritized ordering comprises an order of notification of each electronic message of the at least one electronic message according to a message priority of each electronic message at a current time; wherein the message priority of each respective electronic message of the at least one electronic message is based on an interaction history associated with historical electronic messages associated with each respective sender; and causing to display, by the at least one processor, the plurality of electronic messages according to the current prioritized ordering on a screen of at least one computing device associated with the recipient.

In some embodiments, the present disclosure provides an exemplary computer-based method that includes at least the following steps of receiving, by at least one processor, at least one a plurality of electronic messages residing in an electronic inbox associated with a recipient, wherein each at least one the plurality of electronic messages is are associated with at least one sender and a recipient; generating, by the at least one processor, a set of message data associated with each at least one electronic message of the plurality of electronic messages; wherein each respective set of message data comprises: i) at least one sender indicator representing the respective sender of each respective at least one electronic message, and ii) at least one message subject indicator representing a respective subject of each respective at least one electronic message; transmitting, by the at least one processor, each respective set of message data to a message prioritization system; wherein the message prioritization system comprises at least one message prioritization processor configured to: utilize a message prioritization machine learning model to predict a current prioritized ordering of the plurality of electronic messages at least one electronic message based at least in part on a plurality of parameters associated with each of the at least one electronic message of the plurality of electronic messages; wherein the plurality of parameters comprise: i) at least one calendar event parameter that represents a calendar event associated with a respective electronic message, ii) at least one personnel parameter associated with the at least one sender indicator of each respective electronic message, and iii) at least one message subject parameter associated with the at least one message subject indicator of each respective electronic message; wherein the current prioritized ordering comprises an order of notification of each electronic message of the plurality of electronic messages at least one electronic message according to a message priority of each electronic message at a current time; wherein the message priority of each respective electronic message of the plurality of electronic messages at least one electronic message is based on an interaction history associated with historical electronic messages associated with each respective sender; and transmit the current prioritized ordering to the at least one processor; and causing to display, by the at least one processor, the plurality of electronic messages at least one electronic message according to the current prioritized ordering on a screen in communication with the at least one processor.

In some embodiments, the present disclosure provides an exemplary computer-based system that includes at least the following components of a non-transitory computer-readable memory having instructions stored thereon, and at least one processor in communication with the non-transitory computer-readable memory and configured to perform the instructions. The instructions include: access a plurality of electronic messages residing in an electronic inbox associated with a recipient, wherein the plurality of electronic messages are associated with at least one sender; utilize a message prioritization machine learning model to predict a current prioritized ordering of the plurality of electronic messages based at least in part on a plurality of parameters associated with each of the plurality of electronic messages; wherein the plurality of parameters comprise: i) at least one calendar event parameter that represents a calendar event associated with a respective electronic message, ii) at least one personnel parameter associated with the sender of the respective electronic message, and iii) at least one message subject parameter associated with a subject of the respective electronic message; wherein the current prioritized ordering comprises an order of notification of each electronic message of the at least one electronic message according to a message priority of each electronic message at a current time; wherein the message priority of each respective electronic message of the at least one electronic message is based on an interaction history associated with historical electronic messages associated with each respective sender; and cause to display the plurality of electronic messages according to the current prioritized ordering on a screen of at least one computing device associated with the recipient.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

FIG. 1 through 8 illustrate systems and methods of meeting rescheduling predictions using machine learning techniques and database intercommunication. The following embodiments provide technical solutions or technical improvements that overcome technical problems, drawbacks or deficiencies in the technical fields involving electronic message organization and automated sorting, surfacing and presentation of received messages in a robust, accurate and efficient manner to improve the performance and usability of electronic messaging programs and applications, among others. As explained in more detail, below, technical solutions or technical improvements herein include aspects of message tracking and correlation to related data beyond the electronic messages themselves using machine learning to correlate each received electronic message with related data affecting importance of each message by coordinating various databases and data sources to ingest holistic message contexts for more accurate and powerful priority predictions to improve sorting, surfacing and presentation of electronic messages in an electronic messaging application. Based on such technical features, further technical benefits become available to users and operators of these systems and methods. Moreover, various practical applications of the disclosed technology are also described, which provide further practical benefits to users and operators that are also new and useful improvements in the art.

Figure 1:
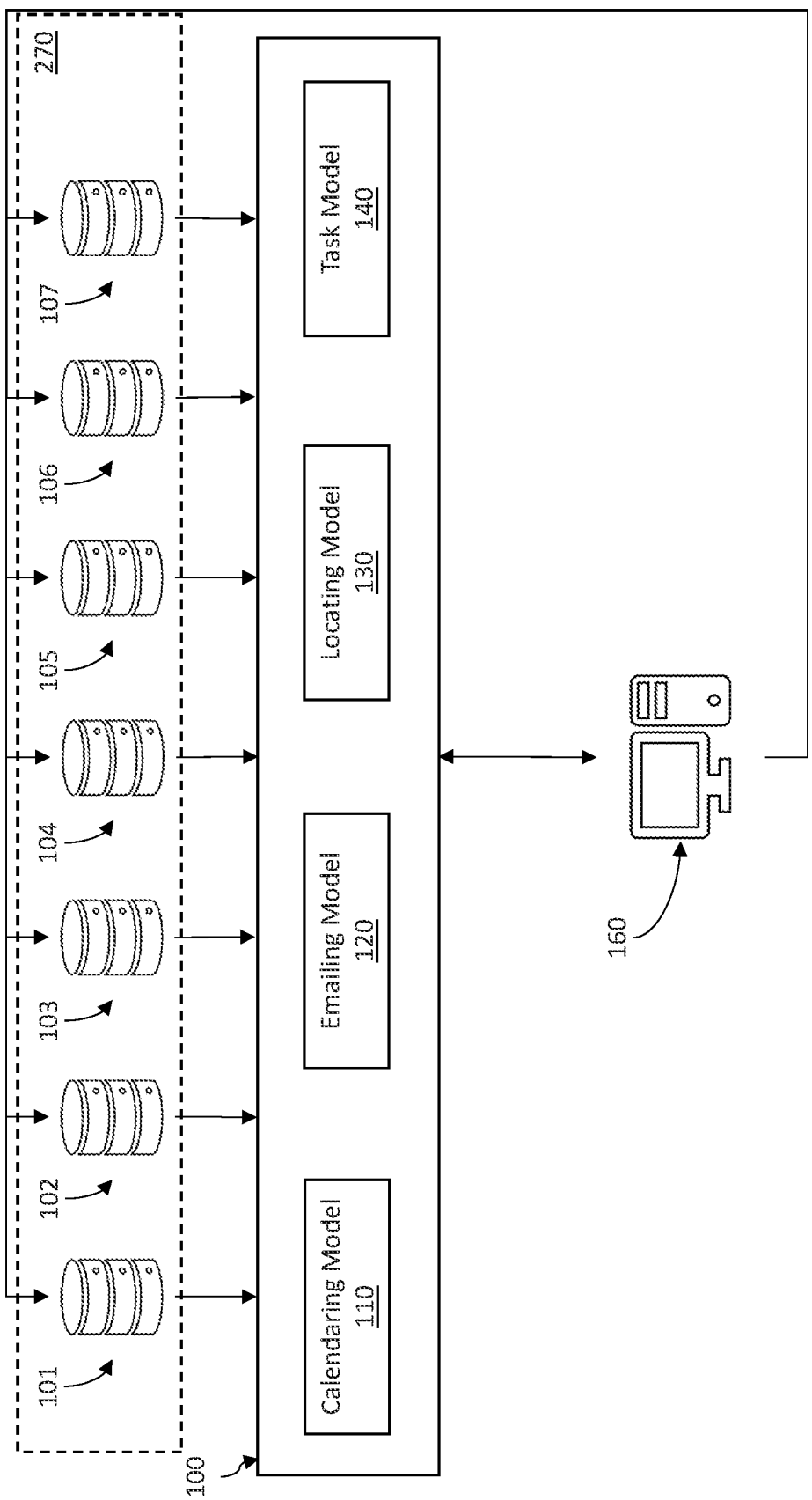
FIGS. 1-8 show one or more schematic flow diagrams, certain computer-based architectures, or screenshots of various specialized graphical user interfaces which are illustrative of some exemplary aspects of at least some embodiments of the present disclosure.

FIG. 1 depicts a diagram of an exemplary illustrative collaboration system according to an illustrative embodiment of the present invention.

In some embodiments, a collaboration system 100 access schedule and communication data associated with users to facilitate collaboration between and amongst the users by providing collaborative services and functions. In some embodiments, the collaboration services include predictions as to various collaborative interactions, such as, e.g., predicting optimum meeting schedules, email prioritization, task schedules and prioritization, among other collaboration services, and generating electronic calendar and electronic communication items, such as, electronic calendar meeting invites, electronically booking locations such as meeting rooms, and electronically ordering and prioritizing communication. In some embodiments, the collaboration system 100 may automatically convey the prediction to each user involved with the collaborative interaction at a respective user computing device 160.

In some embodiments, the user computing device 160 may include a personal computer, a mobile computing device such as a tablet or smartphone, among other computing devices. In some embodiments, there may be a plurality of user computing devices 160 in communication with the collaboration system 100, such as, e.g., between about 1 and about 10 computing devices, between about 1 and about 20 computing devices, between about 1 and about 100 computing devices, or any other number of computing devices for providing collaboration services to each user of, e.g., a set of customers, an organization such as a company, corporation, foundation, family, social club, school, university, government agency, or other organization, a set of organizations, or other group of users.

In some embodiments, the collaboration system 100 receives data from multiple data sources related to user schedules, relationships and communication to facilitate comprehensive and accurate prediction of collaboration characteristics for automatically initiating collaborative interactions. In some embodiments, the data may include, e.g., user calendar data, organizational personnel data, user location data, meeting room data, user email data, user task data, user work product data, among other task, communication and schedule data. Accordingly, in some embodiments, the collaboration system 100 receives the user calendar data, the organizational personnel data, the user location data, the meeting room data, the user email data, the user task data, and the user work product data from a calendar database 101, an organization database 102, a location database 103, a meeting room database 104, an email database 105, a task database 106, and a work product database 107, respectively.

In some embodiments, the calendar database 101 may include a virtual calendar associated with each user in communication with the collaboration system 100 via a respective user computing device 160. The virtual calendar may include scheduled meetings and appointments, out-of-office periods, scheduled vacations, working hours, among other calendar-related data of each user in communication with collaboration system 100. In some embodiments, the virtual calendar may include scheduling information such as, e.g., availability and meeting history (e.g., cancellations, rescheduled meetings, relocated meeting, etc.) that are represented in a calendar program associated with each user. Examples of such calendar programs may include but are not limited to, e.g., Microsoft™ Outlook™, Google™ Calendar, Apple™ Calendar, IBM™ Notes, among other programs having virtual calendaring functions. Information entered into such programs may be stored in the calendar database 101 to aggregate scheduling information for use by the collaboration system 100.

In some embodiments, the organization database 102 may include a virtual organization chart or other representation of position hierarchy associated with each user in communication with the collaboration system 100 via a respective user computing device 160. The virtual organization chart may include a hierarchy of personnel in an organization and an organization structure, including, e.g., entry-level personnel up through senior management and executives.

In some embodiments, the location database 103 may include a representation of a location of each user in communication with the collaboration system 100 via a respective user computing device 160. The location may include, e.g., a latitude and longitude, a street address, a building identification, a room identification within a building, a floor within a building, among others and combinations thereof.

In some embodiments, the meeting room database 104 may include a list of possible meeting rooms and a representation of a location of each room listed as a possible meeting room. The location may include, e.g., a latitude and longitude, a street address, a building identification, a room identification within a building, a floor within a building, among others and combinations thereof.

In some embodiments, the email database 105 may include, e.g., an archive of sent and received emails associated with each user in communication with the collaboration system 100. In some embodiments, the emails may include, e.g., metadata, text, attachments, media, recipients, senders, carbon-copy (CC) recipients, among other data associated with each email. In some embodiments, the emails may be extracted or otherwise received from an email program or service associated with each user. Examples of such email programs or services may include but are not limited to, e.g., Microsoft™ Outlook™, Google™ Gmail™, Apple™ Mail, IBM™ Notes, among other email programs and services. Information entered into such programs may be stored in the calendar database 101 to aggregate scheduling information for use by the collaboration system 100.

In some embodiments, the task database 106 may include a history of work tasks assigned to each user. In some embodiments, the history may include, e.g., start dates, completion dates, start times, completion times, task subject, task project, collaborators or team-mates associated with each task, among other task related data. In some embodiments, the task database 106 may receive the task history from project management, task management and task tracking platforms and programs, such as, e.g., Jira™, Microsoft Dynamics™, NetSuite™, Launchpad™, among others and combinations thereof.

In some embodiments, the work product database 107 may include a history of work product produced by each user in communication with the collaboration system 100. In some embodiments, the work product may include completed projects, such as, e.g., papers, administrative documents, published documents, documents submitted to, e.g., supervisors or project management platforms as complete, source code, software releases, among other types of work product. The work product database 107 may include, e.g., a document repository, a document storage, a cloud storage platform, a server database, a distributed database, among others.

As used herein, a "database" refers to any suitable type of database or storage system for storing data. A database may include centralized storage devices, a distributed storage system, a blockchain network, and others, including a database managed by a database management system (DBMS). In some embodiments, an exemplary DBMS-managed database may be specifically programmed as an engine that controls organization, storage, management, or retrieval of data in the respective database. In some embodiments, the exemplary DBMS-managed database may be specifically programmed to provide the ability to query, backup and replicate, enforce rules, provide security, compute, perform change and access logging, or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, or objects. In some embodiments, the exemplary DBMS-managed database may be specifically programmed to include metadata about the data that is stored.

In some embodiments, the collaboration system 100 may include models for performing multiple collaborative services. In some embodiments, the collaboration system 100 includes a calendaring model 110 to, e.g., automatically schedule, reschedule and cancel meetings, appointments, out-of-office periods, unavailability periods, and other virtual calendar items associated with users based on data from one or more of the calendar database 101, the organization database 102, the location database 103, the meeting room database 104, the email database 105, the task database 106, and the work product database 107. In some embodiments, the calendaring model 110 may include, e.g., machine learning models, such as, e.g., one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
    ii) Transfer the input data to the exemplary neural network model,
    iii) Train the exemplary model incrementally,
    iv) determine the accuracy for a specific number of timesteps,
    v) apply the exemplary trained model to process the newly-received input data,
    vi) optionally and in parallel, continue to train the exemplary trained model with a predetermined periodicity.

In some embodiments, the calendaring model 110 may, e.g., employ the AI/machine learning techniques to predict an optimum meeting between attendees based on, e.g., location data, meeting room data, and schedule information including, e.g., calendar data such as availability and meeting history (e.g., cancellations, rescheduling, etc.) among others. Based on such data received from, e.g., the calendar database 101, the location database 103, and the meeting room database 104, the machine learning model may predict a place and time that is least likely to be cancelled or rescheduled. In some embodiments, the machine learning model may incorporate organizational hierarchies from the organization database 102 to prioritize the schedule and location of attendees higher in the hierarchy.

In some embodiments, the calendaring model 110 may employ the machine learning model or AI/machine learning techniques as described above to reschedule cancelled meetings. Such rescheduled meetings may be rescheduled automatically based on, e.g., location data, meeting room data, and schedule information including, e.g., calendar data such as availability and meeting history (e.g., cancellations, rescheduling, etc.) among others, from the location database 103, the meeting room database 104 or the calendar database 101.

In some embodiments, the collaboration system 100 includes an emailing model 120 to, e.g., determine an order of priority of received emails. In some embodiments, the collaboration system 100 may receive electronic messages, including emails, instant message communications, simple message service (SMS) messages, among other electronic message formats. In some embodiments, the emailing model 120 may receive or determine indicators of attributes of the electronic messages, such as, e.g., sender, recipient or recipients, carbon-copied (cc' d) recipients, subject line text, electronic message text, attached files or media, hyperlinks, urgency markers, read-receipts, associated conversations for each electronic message, related calendar events, such as a calendar event created with the electronic message or a calendar event for which the electronic message is a response, among other attributes. In some embodiments, the emailing model 120 may include, e.g., AI/machine learning techniques, such as those described above, to form parameters from one or more of the attributes, such as, e.g., subject line text, sender including data from the organization database 102, and related calendar events including calendar data from the calendar database 101 by correlating each of the attributes with a likelihood of the user viewing, responding to, forwarding, deleting, delaying, or otherwise interacting with the electronic message.

In some embodiments, using the parameters, the AI/machine learning techniques of the emailing model 120 may predict a level of priority of each electronic message. In some embodiments, the level of priority may be a priority scale, such as a numeric scale in a range of between about 1 and about 10, between about 1 and about 5, between about 1 and about 100, or other range. In some embodiments, the level of priority may include a relative level of priority, where the emailing model 120 ranks each electronic message according to a relative priority level compared to each other electronic message. Accordingly, in some embodiments, a user may be presented with a list of electronic messages in an order of priority such that the most important or actionable electronic messages may be presented first.

In some embodiments, the collaboration system 100 includes a locating model 130 to, e.g., optimize a location of a meeting based on, e.g., location data from the location database 103 and meeting room data from the meeting room database 104. In some embodiments, the locating model 130 employs AI/machine learning techniques, such as those described above, to predict an optimum location for a meeting that will reduce the likelihood of the meeting being cancelled, rescheduled or relocated. In some embodiments, the optimum location depends on a location of each attendee to a meeting as well as a location of each available meeting room for the meeting. In some embodiments, the locating model 130 may also take into account meeting room resources, such as, e.g., video conferencing equipment, technology support, size, furniture, among other features of a meeting room. In some embodiments, the predicted optimum location can be provided to the calendar model 110, which may, in turn, automatically schedule a meeting using the predicted optimum meeting location.

In some embodiments, the collaboration system 100 includes a task model 140 to, e.g., automatically schedule calendar events to perform a task associated with one or more meetings based on, e.g., email data from the email database 105 associated with emails related to the meetings, task data from the task database 106 associated with current and past tasks of each attendee, and work product data from the work product database 107 associated with completed work product of each attendee. In some embodiments, the task model 140 interacts with the calendar model 110 to determine tasks associated with an upcoming meeting, a time to complete the tasks, and attendees associated with the task. To do so, in some embodiments, the task model 140 employs AI/machine learning techniques, such as those described above, to predict a task parameter leading up to the meeting. The task parameter can be used by the calendar model 110 to automatically determine a task time and location for the associated attendees to complete the task prior to the meeting. In an embodiment, the calendar model 110 may then automatically schedule the task time and location each attendee's respective calendar to facilitate private, uninterrupted work time.

Figure 2:
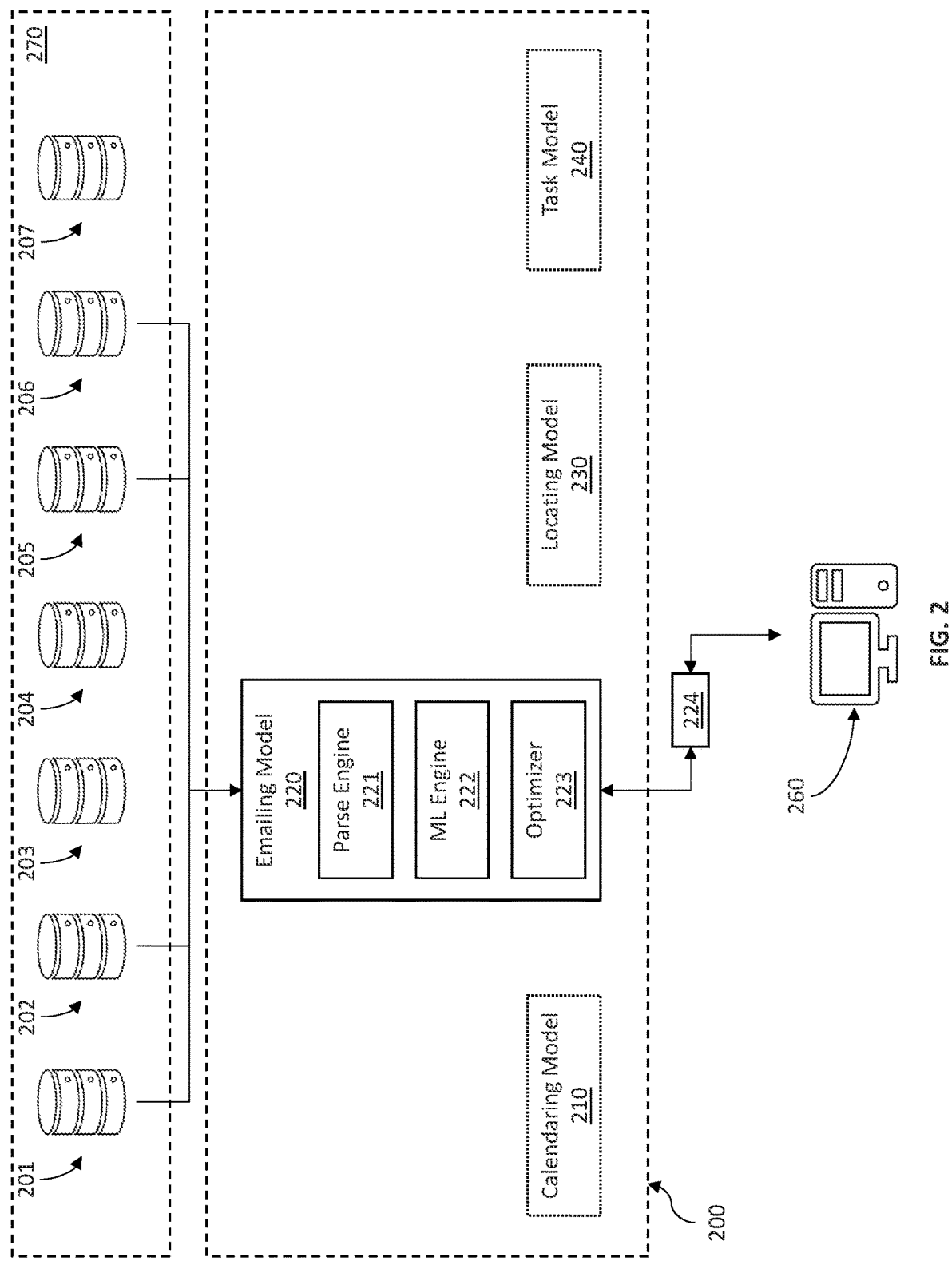

FIG. 2 depicts a diagram of an emailing model for an exemplary illustrative automated email management system in accordance with an illustrative embodiment of the present invention.

In some embodiments, a collaboration system 200 includes an emailing model 220 in communication with collaboration databases, such as, a calendar database 201, an organization database 202, an email database 205 and a task database 206, among other suitable databases for providing information for email or other communication management. In some embodiments, each of the collaboration databases may include data in a suitable format, such as, e.g., tables, text, tuples, arrays, etc. Each data item in the collaboration databases may also include metadata associated with information such as, e.g., origin of the data, destination, format, time and date, geographic location information, source identifier (ID), among other information.

In some embodiments, the emailing model 220 may leverage the data in the collaboration databases, including associated metadata, to predict message priority, such as most time-sensitive communications or communications likely to require the most attention based on scheduling information related to senders and recipients of the communication, related calendar events and times thereof, previous related messages, open work tasks and urgency thereof, among other data.

In some embodiments, the emailing model 220 may predict the message priority using the data in the collaboration databases. The emailing model 220 may receive the data and employ a parse engine 221, a message prioritization machine learning engine 222 and an optimizer 223 to deduce a correlation between the data and a most probable message priority relative to other messages or relative to how quickly the user should respond, or both. In some embodiments, each of the parse engine 221, message prioritization machine learning engine 222 and the optimizer 223 may include, e.g., software, hardware or a combination thereof. For example, in some embodiments, the parse engine 221 may include a processor and a memory, the memory having instructions stored thereon that cause the processor to parse data. In some embodiments, the message prioritization machine learning engine 222 may include a processor and a memory, the memory having instructions stored thereon that cause the processor to predict message priority from the parsed data. In some embodiments, the optimizer 223 may include a processor and a memory, the memory having instructions stored thereon that cause the processor to optimize the parse engine 221 or the message prioritization machine learning engine 222 according to, e.g., an error of the predicted message priority, e.g., based on a user interaction 224.

In some embodiments, the parse engine 221 may transform the data, such as, e.g., message subject, message recipients, message sender, listed attachments, related calendar events, related tasks, etc., as well as the user interaction 224 including setting a follow-up flag, a message category flag, or other user interaction 224, into, e.g., feature vectors or feature maps such that the message prioritization machine learning engine 222 may generate message priority predictions based on features of the data. Thus, in some embodiments, the parse engine 221 may receive the data, parse the data, and extract features according to a feature extraction algorithm. Data parsing and feature extraction may utilize methods depending on a type of data being received. For example, the parse engine 221 may include language parsing when the data includes text and character strings. Thus, in some embodiments, the parse engine 221 may include text recognition models including, e.g., a classifier for natural language recognition. However, in some embodiments, the data may be a table. In such a case, the parse engine 221 may simply extract features into, e.g., a feature vector directly from the data. However, in some embodiments, the data may include a combination of character strings, as well as structured data, such as tables, tuples, lists, arrays, among other. Thus, in some embodiments, the parse engine 221 may include model or algorithm for parsing the character strings and then extracting feature vectors from the structured data and the parsed character strings.

In some embodiments, the feature extraction algorithm may include, e.g., independent component analysis, an isomap, kernel principle component analysis (PCA), latent semantic analysis, partial least squares, principal component analysis, multifactor dimensionality reduction, nonlinear dimensionality reduction, multilinear PCA, multilinear subspace learning, semidefinite embedding, autoencoding, among others and combinations thereof. As a result, the parse engine 221 may generate feature vectors having, e.g., availability and meeting history features, personnel features, attendee location features, available meeting room features, or out-of-office features, among other possible features.

In some embodiments, the feature vectors produced by the parse engine 221 may be employed by the message prioritization machine learning engine 222 to develop a prediction for a message priority (e.g., on a scale from 1 to 10 with 1 being of greatest priority, or according to any other indication of priority). In some embodiments, the message prioritization machine learning engine 222 is configured to make at least one prediction in response to the feature vectors: a message priority as presented to the user by a message priority indicator. In some embodiments, the message prioritization machine learning engine 222 may utilize, e.g., classification machine learning techniques to develop a prediction from the availability and email history features, personnel features, message sender features, message recipient features, task features, and calendar event (e.g., meeting, etc.) features for each message. In some embodiments, the result of this prediction process produces a message priority parameter for each message that correspond to a message priority indicative to a relative priority to address the message contents for the user. For example, the message priority parameter may be or be proportional to a degree of priority of the electronic message, where, e.g., a higher number indicates greater priority and lower number indicates lesser priority, or vice versa. As such, lists of messages can be formed sorting or filter, or both, electronic messages according to the respective message priority parameters, e.g., descending in a graphical user interface from greatest priority messages at a top and least priority at the bottom, or vice versa.

For example, in some embodiments, the message prioritization machine learning engine 222 may include, e.g., a convolutional neural network (CNN) having multiple convolutional layers to receive a feature map composed of each of the feature vectors, convolutionally weight each element of the feature map using the convolutional layers, and generate an output representing both the meeting location parameter and the meeting time parameter.

In some embodiments, the message prioritization machine learning engine 222 may then convert the message priority parameter into a message priority flag or indicator to present to the user. In some embodiments, the message priority flag or indicator is transmitted to the user computer 260 to produce a message priority indication for the user to view at the user computing device 260. The message priority indication causes the collaboration system 200 to automatically present the message to the user at a priority ordered location within a list of messages, where the prioritized order represented the priority of each message received by the user relative to each other message.

In some embodiments, the user may respond to the message via the user interaction 224 or change the priority of the message via the user interaction 224. In some embodiments, the user interaction 224 then be returned to an optimizer 223 that evaluates the message priority parameter against a ground truth, such as, the behavior of the user relative to the associated message. Thus, in effect, each response to a message may be used as feedback into the optimizer 223 to optimize the emailing model 220 for on-line learning. Thus, in some embodiments, the optimizer 223 may determine an error associated with the predicted message priority parameter as compared to the order in which the user responded to each message or otherwise acted on each message, including, e.g., deleting messages, reordering the prioritized list of messages, changing the message priority indicator for the message, archiving the message, responding to one or more messages in an order the is the same or differs from the prioritized list, etc. For example, a user may receive a first message with a priority predicted to be lower than that of a second message (the second message having been received either before or after the first message). If the user interacts with the first message before the second message, the user acted as though the first message had higher priority, and thus, the optimizer 223 may train the message prioritization machine learning engine 222 according to the error resulting from the priority prediction of each of the first and second messages. In some embodiments, the optimizer 223 may backpropagate the error to the parse engine 221, the message prioritization machine learning engine 222, or both to train each engine in an on-line fashion.

Figure 3:
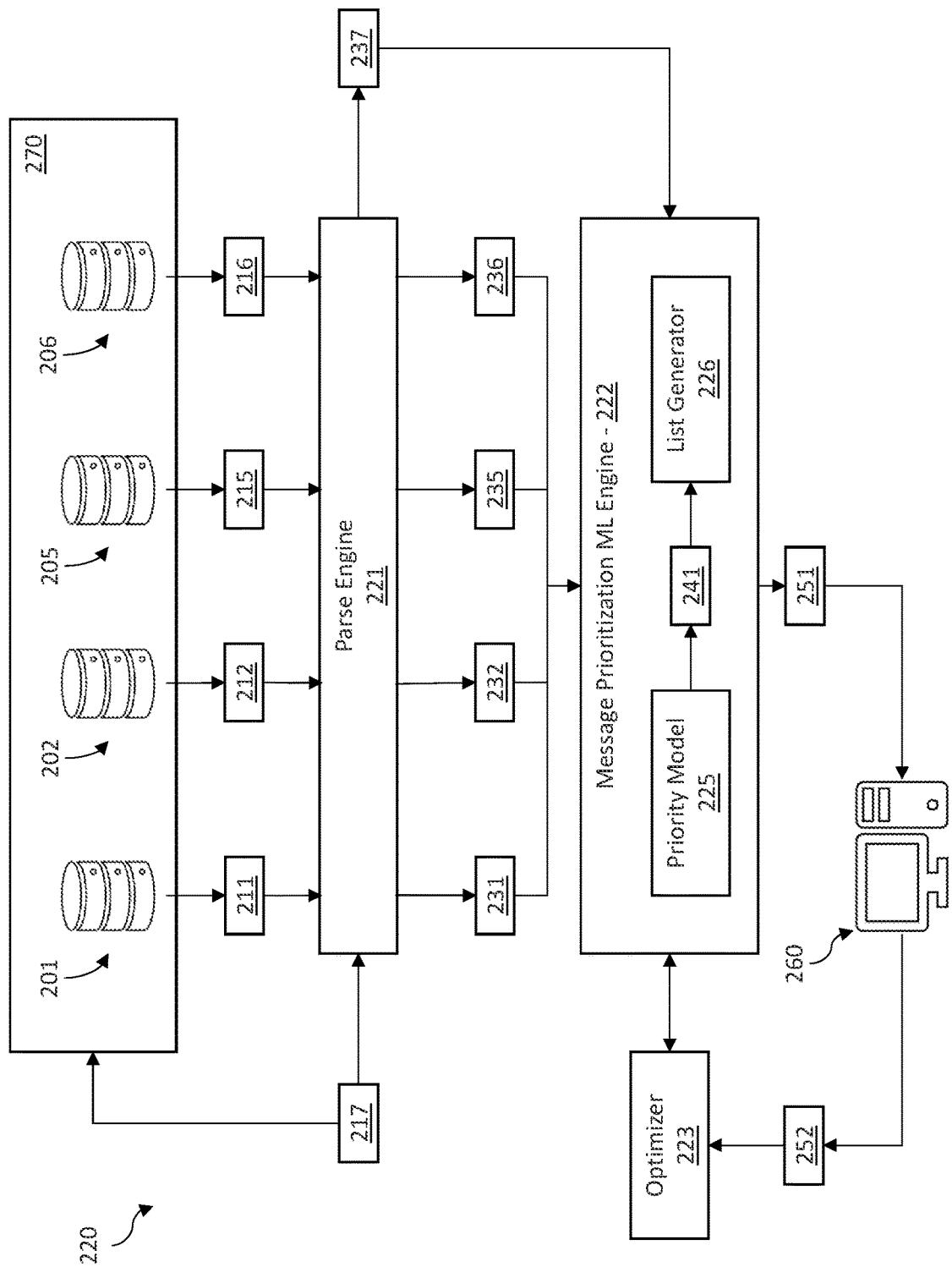

FIG. 3 depicts a diagram of a calendaring model for an exemplary illustrative automated calendar management system in accordance with an illustrative embodiment of the present invention.

In some embodiments, a collaboration system 200 may initiate an automated meeting rescheduling process upon receipt of a user interaction including, e.g., message data 217. In some embodiments, the user interaction includes an out-of-office message, status or request provided by, e.g., a user computing device, such as the user computing device 260 or other device, that generates the message data 217. In some embodiments, the message data 217 includes an identification of the associated user and a date range in which the user is expected to be unavailable. In some embodiments, the message data 217 may include data formatted for the collaboration system 200 and ready to undergo feature extraction. However, in some embodiments, the message data 217 may include an image, character string, or other unstructured data related to the out-of-office message, status or request. In some embodiments, where the message data 217 is unstructured, the parse engine 211 may parse the date using, e.g., a parsing algorithm such as a natural language recognition model, an image recognition model, or other algorithm.

In some embodiments, based on message data 217, the collaboration system 200 may pull data from collaboration databases 270 including each of the calendar database 201, the email database 205, the task database 106, or any combination thereof. In some embodiments, the collaboration system 200 pulls data from the collaboration databases 270 based on parameters of the message data representing attributes. For example, the parameters may represent, e.g., a calendar event attribute that links the message to a calendar event in the calendar database 201, a personnel attribute that identifies the sender and other recipients of the message for matching to data in the organization database 201, a message subject attribute including data represented in a subject line or subject tag of the message for identifying matching data in the calendar database 201, email database 205 or task database 106, or a combination thereof. Additional attributed may be included, such as, e.g., message body text, dates, linked messages (e.g., messages forwarded with the message data 217, replied to by the message data 217, or other functions linking the message to prior messages), among other information. Accordingly, the parse engine 221 may analyze the message data 217 to identify the above described attributes, and pull associated data from, e.g., the calendar database 201, the email database 205, the task database 106, or any combination thereof. In some embodiments, the collaboration databases 270 are configured to recognize the message attributes or parameters from the message data 217 to push matching items to the parse engine 221.

In some embodiments, collaboration system 200 may direct the message data 217 to the collaboration databases 270. In response to the message data 217, each of the calendar database 201, the email database 205, the task database 106, or any combination thereof may determine data to provide to the parse engine 221. For example, in some embodiments, the calendar database 201 may ingest the message data 217 to identify message subject parameters from the message subject line or tag and from the message body to determine each scheduled meeting associated with the user that matches the subject. The calendar database 201 may identify the matching scheduled meetings and determine attendees for each scheduled meeting. In some embodiments, the calendar database 201 may also identify a meeting history associated with the subject, including scheduled meetings, cancelled meetings, rescheduled meetings, relocated meetings, among other meeting history items. In some embodiments, the calendar database 201 may provide the scheduled meetings, attendees, and meeting histories to the parse engine 221 as calendar event history data 211.

In some embodiments, the organization database 202 may utilize the senders and recipients identified in the message data 270 to identify personnel hierarchy within an associated organization according to, e.g., an organization chart or other data related to personnel hierarchy for the associated organization. The organization database 202 may provide the personnel hierarchy based on the, e.g., organization chart, to the parse engine 221 as personnel data 212 associated with each sender or recipient of the message.

In some embodiments, the email database 205 may utilize the personnel data 212, subject attributes of the message data 217, or linked message data identified in the message data 217, or a combination thereof, to determine related messages in a message history and associated historical message data and user interaction data for each message in the message history of the email database 205. For example, the email database 205 may record receipt times and response times for each message by each sender and recipient of each message. The time between receipt and response or other action on the message may be indicative of the priority of the message in the message history, where a shorter time may indicate higher priority. However, other characteristics may also be correlated with priority, such as message length. For example, a longer message may result in a user waiting longer before taking action, e.g., by taking action on other shorter messages first, thus reducing the strength of correlation between response time and priority. However, a long message that is responded to quickly may be correlated with further increased priority. Similarly, any dates mentioned in the historical messages may be combined with the time to take action, the length, both or neither to factor into priority prediction. Thus, these characteristics and others may be provided to the parse engine 221 as historical message data 213 for correlating user interaction patterns relative to historical messages with priority of the messages.

In some embodiments, the task database 206 may utilize the message data 217 to determine subject attributes of the message data 217, or linked message data identified in the message data 217, or a combination thereof, and identify related tasks, such as, e.g., open work tasks and priority flags thereof in the task database 206. For example, in some embodiments, the work task database 206 may track work task characteristics, including, e.g., importance or priority data, due dates, start dates, duration, user interactions relative to a task (e.g., progress through time in completing each of one or more stages of a task), among other characteristics. The characteristics of the work tasks related to or linked to the message may be provided to the parse engine 221 as work task data 216.

For example, by comparing the subject or body text of the message data 217 with subjects and names of tasks in the task database 206, the task database 206 or the parse engine 221 may identify similar or related work tasks. For example, in some embodiments, the work task data 216 includes tasks that are related to the message data 217 that may affect the priority of message based on, e.g., a task due date, a task priority, or other task related data. In some embodiments, the work task data 216 includes tasks that must be completed in response to the message or are otherwise related to the message, such as tasks to be reviewed in response to the message. In some embodiments, the work task data 216 also includes historical work tasks that are similar to the subject of the message data 217.

In some embodiments, the parse engine 221 may ingest, e.g., each of the calendar event data 211, the personnel data 212, the historical message data 215 and the work task data 216 and extract features therefrom. Thus, in some embodiments, the parse engine 221 may transform the data as well as the message data 217 into, e.g., feature vectors or feature maps to produce input parameters for predicting message priority. Thus, in some embodiments, the parse engine 221 may receive the data, parse the data, and extract features according to a feature extraction algorithm. Data parsing and feature extraction may utilize methods depending on a type of data being received. For example, the parse engine 221 may include language parsing when the data includes text and character strings, e.g., the subject data and body text data. In some embodiments, the parse engine 221 may include text recognition models using, e.g., a classifier for natural language recognition to identify and recognize words and phrases in unstructured text or character strings. However, in some embodiments, the data may be a table. In such a case, the parse engine 221 may simply extract features into, e.g., a feature vector directly from the data. However, in some embodiments, the data may include a combination of character strings, as well as structured data, such as tables, tuples, lists, arrays, metadata tags or flags, among others. Thus, in some embodiments, the parse engine 221 may include model or algorithm for parsing the character strings and then extracting feature vectors from the structured data and the parsed character strings.

In some embodiments, the parse engine 221 may also ingest the message data 217 to generate message data features 237 representative of the message data 217 for input into the message prioritization machine learning engine 222. For example, the parse engine 221 may ingest each attribute of the message data 217, including, e.g., the sender and recipient attributes, a time and date attribute, a subject line text, a message body text, among others and combinations thereof. In some embodiments, the parse engine 221 may identify and extract each attribute from the message data 217 using suitable parsing algorithms, as described above, to identify, e.g., subjects, projects, tasks, names, etc. described in the subject line or message body or both as represented in the message data 217. For example, the parse engine 221 may be configured to recognize the subject line of a message and extract information represented therein. Thus, the parse engine 221 can produce input features for the message prioritization machine learning engine 222 including message subjects or other concepts contained in the message. Thus, in some embodiments, the parse engine 221 may include model or algorithm for parsing the character strings and then extracting feature vectors from the structured data and the parsed character strings.

In some embodiments, as a result of the parsing and feature extraction, the parse engine 221 may produce calendar event features 231, personnel features 232, historical message features 235, work task features 236, and message features 237 from each of the calendar event data 211, the personnel data 212, the historical message data 215, the work task data 216 and message data 217, respectively. Accordingly, each set of features can provide inputs for correlation to priority by the message prioritization machine learning engine 222 according to training of a suitable priority model 225, e.g., a classifier, regression model, neural network, or other type of machine learning model.

In some embodiments, the parse engine 221 may extract calendar event features 231 from the calendar event data 211 using parsing algorithms for identifying and extract features characterizing a relationship between each related calendar event with the electronic message data 217. For example, the parse engine 221 may identify, e.g., dates associated with the calendar event and a date of receipt of the electronic message in the calendar event data 231 and message data 217, respectively. Thus, the parse engine 221 may then determine a temporal proximity between the message receipt and the calendar event data to produce a feature characterizing how near in time the calendar event is. A temporally near calendar event relative to an electronic message may be correlated to increased priority of the electronic message. The parse engine 221 may identify and extract other relationships between the calendar event data 211 and the message data 217, including, e.g., follow-up flags, attachments to an electronic calendar event or the electronic message or both, parties invited to the calendar event that are or are not a recipient or sender of the electronic message, among other factors. Thus, the parse engine 211 may produce calendar event features 231 representing relationships between the electronic message and one or more electronic calendar events.

In some embodiments, the parse engine 221 may extract personnel features 232 from the personnel data 212 using parsing algorithms for identifying and extract features characterizing a relationship between each related personnel data item of the senders and recipients with the electronic message data 217. In some embodiments, a hierarchical position of a person within an organization may affect the priority of a message. For example, a chief executive officer that sends an electronic message may result in the electronic message having higher priority for timely response. Thus, the personnel data 212 related to each sender and recipient of the electronic message may be correlated to priority of the electronic message, including, e.g. hierarchical position data indicative of each sender or recipients position within a hierarchical structure of an organization, e.g., according to an organizational chart. The parse engine 211 may identify and extract these features of the recipients and senders in the message data 217. Thus, the parse engine 211 may produce personnel features 232 representing relationships between the electronic message and one or more senders and recipients.

In some embodiments, the parse engine 221 may extract historical message features 235 from the historical message data 215 using parsing algorithms for identifying and extract features characterizing a relationship between each related historical message with the electronic message data 217. For example, the parse engine 221 may identify, e.g., dates and times associated with the receipt of the historical messages, dates and times associated with the responses to the historical messages and a date and time of receipt of the electronic message in the calendar event data 231 and message data 217, respectively. Thus, the parse engine 221 may then determine historical response behaviors including historical times-to-respond between receipt of a historical message and a sending of a response to the historical message for historical messages related to the received electronic message of the message data 217. Shorter times-to-respond for historical messages related to the received electronic message may be correlated to greater priority, while longer times-to-respond may be correlated to lesser priority. However, length and subject of messages may affect to time-to-respond. Thus, the parse engine 221 may also extract length of message text, sender, recipients, and subjects of the related historical messages to create additional historical message features 235 that, together, may provide a comprehensive, holistic correlation between historical message behaviors and priority. Thus, the parse engine 211 may produce historical message features 235 representing relationships between the electronic message and one or more historical electronic messages, as well as historical user behaviors relative to similar messages.

In some embodiments, the parse engine 221 may extract work task features 236 from the work task data 216 using parsing algorithms for identifying and extract features characterizing a relationship between each related work task with the electronic message data 217. For example, the parse engine 221 may identify, e.g., due dates associated with the work task and a date of receipt of the electronic message in the work task data 236 and message data 217, respectively. Thus, the parse engine 221 may then determine a temporal proximity between the message receipt and the work task data to produce a feature characterizing how near in time the task due date is. A temporally near task due date relative to an electronic message may be correlated to increased priority of the electronic message. The parse engine 221 may identify and extract other relationships between the work task data 216 and the message data 217, including, e.g., follow-up flags, documents associated with the work tasks or the electronic message or both, parties included in the work tasks that are or are not a recipient or sender of the electronic message, among other factors. Thus, the parse engine 211 may produce work task features 236 representing relationships between the electronic message and one or more electronic work task records.

In some embodiments, the parse engine 221 may extract calendar event features 237 from the calendar event data 217.

In some embodiments, the feature extraction algorithm may include, e.g., independent component analysis, an isomap, kernel principle component analysis (PCA), latent semantic analysis, partial least squares, principal component analysis, multifactor dimensionality reduction, nonlinear dimensionality reduction, multilinear PCA, multilinear subspace learning, semidefinite embedding, autoencoding, among others and combinations thereof. As a result, the parse engine 221 may generate feature vectors having, e.g., the calendar event features 231, the personnel features 232, the historical message features 235, the work task features 236, and the message features 237 such that predictive features of message priority can be provided to the message prioritization machine learning engine 222. In some embodiments, the feature vectors are aggregated into a feature map prior to modeling in the message prioritization machine learning engine 222.

In some embodiments, the message prioritization machine learning engine 222 receives the calendar event features 231, the personnel features 232, the historical message features 235, the work task features 236 and message features 237 to model message priority for message received by a user that the user has not yet replied to, e.g., according to the message history in the email database 205 to predict a prioritization of messages and form a list order according to priority. In some embodiments, the message prioritization machine learning engine 222 includes a priority model 225.

In some embodiments, the priority model may predict a priority parameter 241 indicative of a probability of a given priority level, e.g., on a scale from 0.0 to 0.1, where the predicted value on the scale represents a probability of greatest priority for the message of the message data 217, which may be interpreted as proportional to the degree or level of priority of the message. In some embodiments, the priority parameter 241 is based on a correlation between priority and, e.g., the senders and recipients of the message, the date of the message, related calendar events to the message, contents of the message (e.g., topics and subjects as described above), priority of other related messages, quantity, priority and type of related tasks, among other data, as provided by, e.g., the calendar event features 231, the personnel features 232, the historical message features 235, the work task features 236 and message features 237. Thus, in some embodiments, the priority model 225 including, e.g., a classifier, such as those described above, may transform the calendar event features 231, the personnel features 232, the historical message features 235, the work task features 236 and message features 237 into a feature vector output that may be decoded into the priority parameter 241 representing the probable degree of priority.

In some embodiments, a list generator 226 of the message prioritization machine learning engine 222 may receive the priority parameter 241 to generate or modify a prioritized list of messages 251 with the message associated with the message data 217 based on the priority parameter 241 of the message. The prioritized list of messages 251 represents an ordered list of messages ordered according to priority parameters of each message in the list, where a greater magnitude of the priority parameter indicates a higher position in the prioritized list of messages 251 relative of messages having priority parameters with lower magnitudes.

In some embodiments, the prioritized list of messages 251 may automatically alter, e.g., a messaging graphical user interface (GUI) a display at the user computing device 260, such as, e.g., an email GUI, to reflect the priority of messages in the prioritized list of messages 251. The alteration to the messaging GUI can include, e.g., modifying a list of messages to include the message associated with the message data 217 in a position within the list based on the prioritized list of messages 251. Additionally, or alternatively, the message GUI may also be caused to depict other indications of priority, such as, e.g., color coding based on priority ranges of the priority parameter 241, descriptive wording describing the priority level based on priority ranges, priority flags indicating the level of priority, priority score correlated to the priority parameter 241 value, among other indications of priority and combinations thereof. For example, the priority ranges can be a predetermined set of ranges of priority parameter values, such as, e.g., low priority for values from about, e.g., 0.0 to 0.4, medium priority for values from about, e.g., 0.5 to 0.7, and high priority for values from about, e.g., 0.8 to 1.0. However, more or fewer ranges for priority level are contemplated. In some embodiments, the list generator 226 may generate multiple separate lists of messages, ordered according to priority parameter value, where each list corresponds to a priority level (e.g., low, medium, high). Other techniques for representing the relative priority of each message are also contemplated.

In some embodiments, a user at the user computing device 260 may provide user interactions 252 in the messaging GUI relative to the prioritized list of messages 251. For example, a user may select a message for response, select a message for deletion, select a message to ignore, relocate a message in the order of the list, modify a designation of priority of a message, or other interactions and combinations thereof for one or more of the messages in the prioritized list of messages 251. In some embodiments, the user interaction or interactions 252 may affect the relative priority of the message associated with the message data 217 relative to other messages in the prioritized list of messages 251. As a result, the user interaction 252 may effectively correct the priority of the message, for example, by moving the message up or down in the list, moving another message from above to below, or from below to above the message in the list, modify a priority value, range, flag, or color indicative of the priority of message, or other action. In so doing, the user interaction 252 may reclassify the priority of the message, thus deviating from the predicted priority parameter 241. The magnitude of this deviation may be correlated to an error in the prediction by the priority model 225.

Therefore, in some embodiments, the user interaction 252 may be provided to an optimizer 223. In some embodiments, the optimizer 223 may compare the user interaction 252 to the corresponding predicted priority parameter 241. Based on a difference between the user interaction 252 to the corresponding predicted priority parameter 241, the optimizer 223 may determine an error in the predictions by the message prioritization machine learning engine 222. In some embodiments, the optimizer 223 backpropagates the error to the message prioritization machine learning engine 222 to train the priority model 225, e.g., in an on-line fashion such that each prediction 241 may be used as a training pair with the corresponding user interaction 252. Thus, the priority model 225 may be updated as users provide user interactions 252 to continually improve the priority model 225. In some embodiments, the optimizer 223 may employ optimization models including, but not limited to, e.g., gradient descent, regularization, stochastic gradient descent, Nesterov accelerated gradient, Adagrad, AdaDelta, adaptive momentum estimation (AdaM), root-mean-square propagation (RMS Prop), among others and combinations thereof.

In some embodiments, the user interaction 252 may be a second selection after an initial selection. For example, where a user initially interacts with the list generator 226 in accordance with the predicted prioritization list 251, the user may later modify the list or indications of priority represented therein by a later or a second user interaction 252. Thus, the first interaction 252 may reinforce the priority model 225, e.g., the weights or parameters used by the priority 225 to generate the priority parameter 241, while the second may retrain the weights or parameters. Each user interaction that affects the relative priority of a message may be fed back to the optimizer 223 to further train the priority model 225 based on the degree to which each interaction changes the priority from the predicted priority parameter 241.

In some embodiments, the user interaction 252 or the corresponding message and relative priority of the message may be provided to the emailing database 205 to update the message history and message data. In some embodiment, each user interaction 252 may be added to the message history of a given message affected by the user interaction 252, e.g., by affected the priority of the message or through a response or other action taken relative to the message. Accordingly, the email database 205 may be continually updated with information concerning the priority and user interactions relative to each message associated with the user to better train the priority model 225 according to historical messages.

In some embodiments, upon receipt of each new electronic message, the parse engine 221 and message prioritization machine learning engine 222 may update the priority parameters 241 for each message in the list of messages to reflect the most up-to-date context of each electronic message, including, e.g., proximity to calendar events and work tasks, message histories, personnel information, among other possibly time-varying data. Accordingly, the messaging GUI at the user computing device 260 may be regularly updated such that electronic messages are presented to reflect a current priority of each message in, e.g., an inbox or other electronic message interface.

Figure 4:
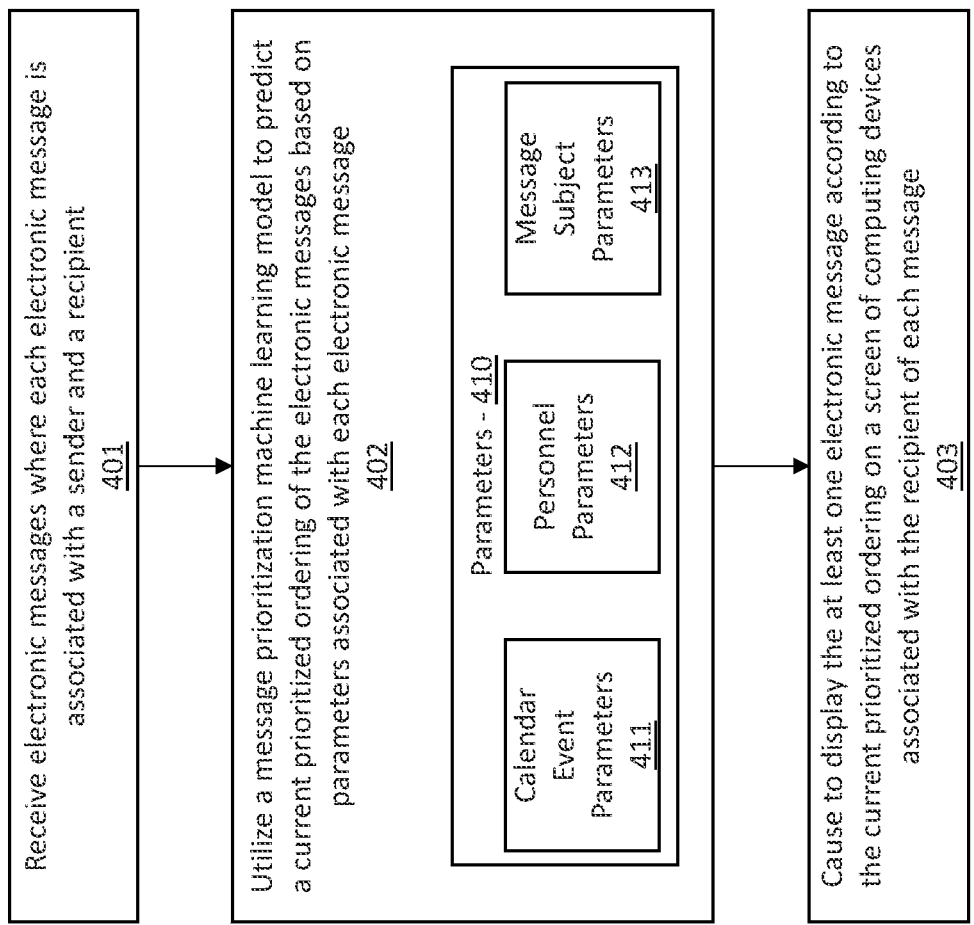

FIG. 4 depicts a flow diagram illustrating an exemplary method for message priority prediction and recommendation according one or more embodiments of the present invention.

At block 401, receive electronic messages where each electronic message is associated with a sender and a recipient.

At block 402, utilize a message prioritization machine learning model to predict a current prioritized ordering of the electronic messages based on parameters 410 associated with each electronic message. For example, the prioritize ordering may be defined by, e.g., a message priority parameter that may be or be proportional to a degree of priority of the electronic message. In some embodiments, the message priority parameter may be related to, e.g., a higher number indicating greater priority and lower number indicating lesser priority, or vice versa. As such, the prioritized ordering can be formed by sorting or filter, or both, electronic messages according to the respective message priority parameters, e.g., descending in a graphical user interface from greatest priority messages at a top and least priority at the bottom, or vice versa. In some embodiments, the prioritized ordering can form a list of only electronic messages having a priority above a particular threshold, such as, e.g., of the 5 or 10 greatest priority electronic messages, or having a priority parameter greater than, e.g., 0.5, 0.6, 0.7, 0.8, or 0.9, where the messages below the threshold may be hidden or displayed in a separate list.

In some embodiments, the plurality of parameters include calendar event parameters 411 that represents a calendar event associated with a respective electronic message, personnel parameters 412 associated with the sender of the respective electronic message, and message subject parameters 413 associated with a subject of each electronic message. In some embodiments, the current prioritized ordering forms an order of notification of each electronic message according to a message priority of each electronic message at a current time. Moreover, in some embodiments, the message priority of each electronic message is based on an interaction history tracking interactions of each sender or recipient or both with messages received prior to the current time (historical messages).

At block 403, cause to display the at least one electronic message according to the current prioritized ordering on a screen of computing devices associated with the recipient of each message, for example, in a message GUI as described above.

Figure 5:
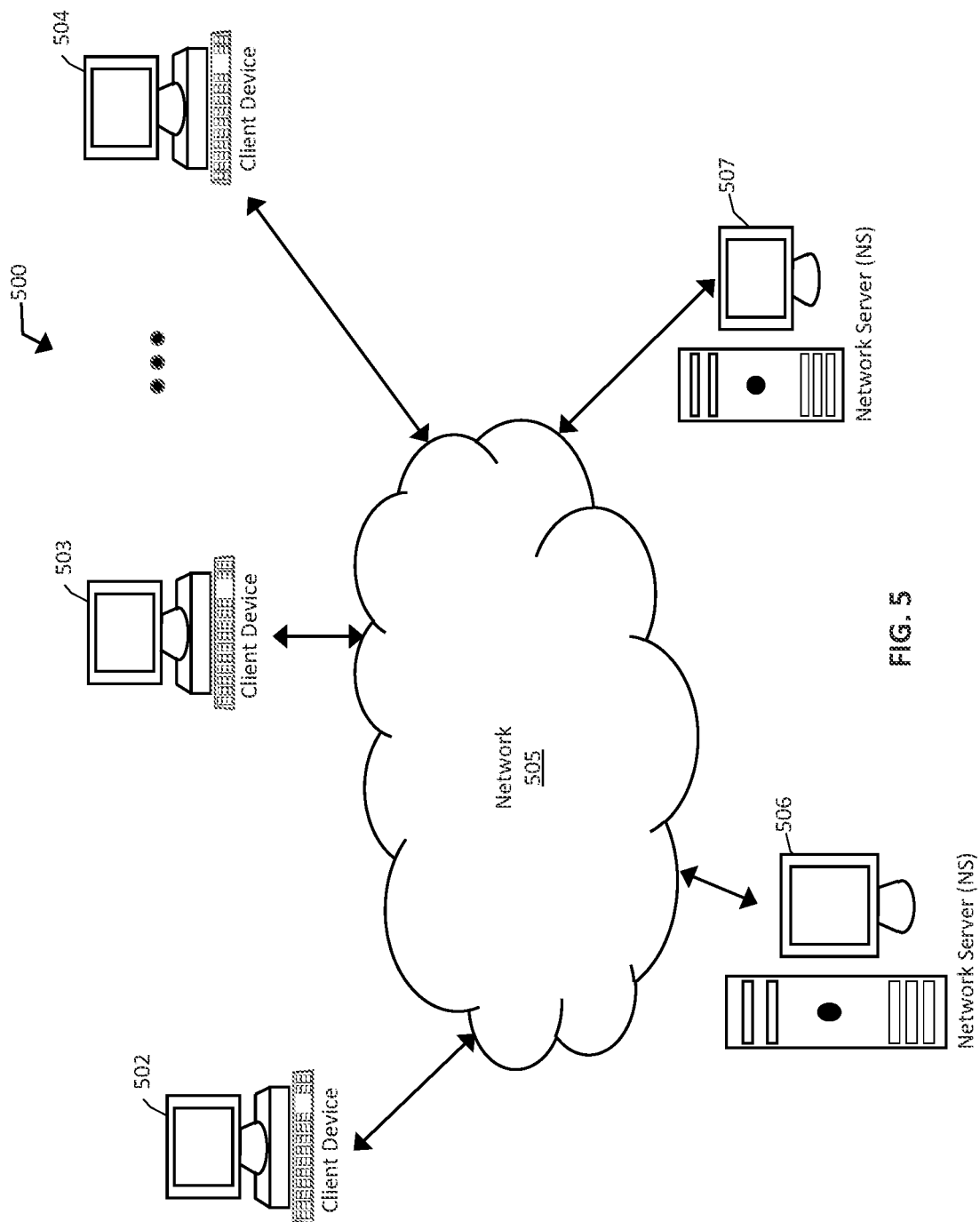

FIG. 5 depicts a block diagram of an exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices or the exemplary inventive computing components of the exemplary computer-based system/platform 500 may be configured to manage a large number of members or concurrent transactions, as detailed herein. In some embodiments, the exemplary computer-based system/platform 500 may be based on a scalable computer or network architecture that incorporates varies strategies for assessing the data, caching, searching, or database connection pooling. An example of the scalable architecture is an architecture that is capable of operating multiple servers.

In some embodiments, referring to FIG. 5, members 502-504 (e.g., clients) of the exemplary computer-based system/platform 500 may include virtually any computing device capable of receiving and sending a message over a network (e.g., cloud network), such as network 505, to and from another computing device, such as servers 506 and 507, each other, and the like. In some embodiments, the member devices 502 through 504 may be personal computers, multiprocessor systems, microprocessor-based or programmable consumer electronics, network PCs, and the like. In some embodiments, one or more member devices within member devices 502-504 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 502-504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), or any other device that is equipped to communicate over a wired or wireless communication medium (e.g., NFC, RFID, NBIOT, 3G, 5G, 6G, GSM, GPRS, WiFi, WiMax, CDMA, satellite, ZigBee, etc.). In some embodiments, one or more member devices within member devices 502 through 504 may include may run one or more applications, such as Internet browsers, mobile applications, voice calls, video games, videoconferencing, and email, among others. In some embodiments, one or more member devices within member devices 502 through 504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 502 through 504 may be specifically programmed by either Java, .Net, QT, C, C++ or other suitable programming language. In some embodiments, one or more member devices within member devices 502 through 504 may be specifically programmed include or execute an application to perform a variety of possible tasks, such as, without limitation, messaging functionality, browsing, searching, playing, streaming or displaying various forms of content, including locally stored or uploaded messages, images or video, or games.

In some embodiments, the exemplary network 505 may provide network access, data transport or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 5G, 6G, GSM, GPRS, WiFi, WiMax, CDMA, satellite and any combination thereof. In some embodiments, the exemplary network 505 may also include mass storage, such as network attached storage (NAS), a storage area network (SAN), a content delivery network (CDN) or other forms of computer or machine readable media.

In some embodiments, the exemplary server 506 or the exemplary server 507 may be a web server (or a series of servers) running a network operating system, examples of which may include but are not limited to Microsoft Windows Server, Novell NetWare, or Linux. In some embodiments, the exemplary server 506 or the exemplary server 507 may be used for or provide cloud or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 501 through 504.

In some embodiments and, optionally, in combination of any embodiment described above or below, for example, one or more exemplary computing member devices 502 through 504, the exemplary server 506, or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
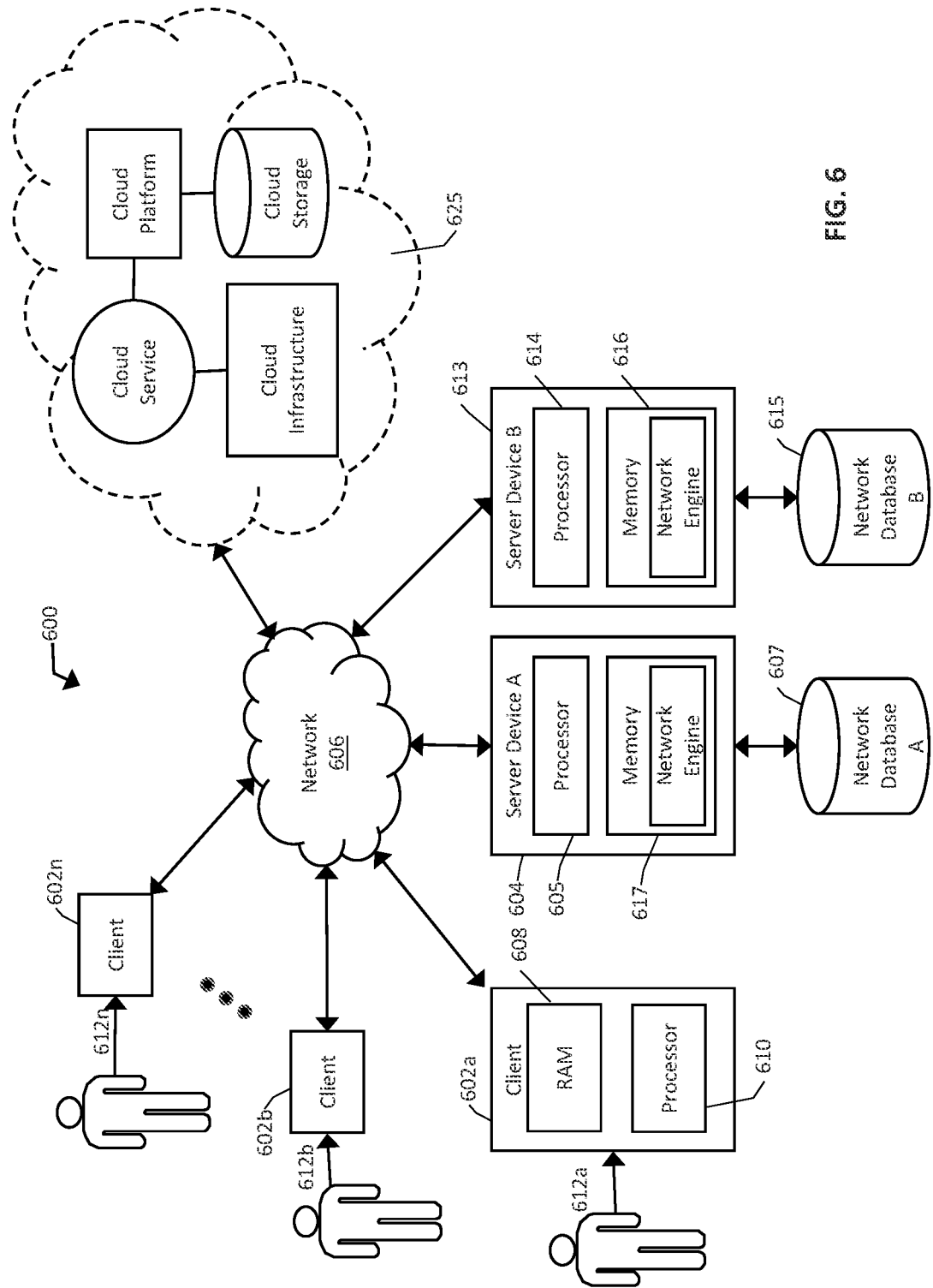

FIG. 6 depicts a block diagram of another exemplary computer-based system/platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 602a, 602b through 602n shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of client 602a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 602a through *n* may also comprise a number of external or internal devices such as a mouse, a CD-ROM, DVD, a physical or virtual keyboard, a display, or other input or output devices. In some embodiments, examples of member computing devices 602a through 602n (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, member computing devices 602a through 602n may be specifically programmed with one or more application programs in accordance with one or more principles/methodologies detailed herein. In some embodiments, member computing devices 602a through 602n may operate on any operating system capable of supporting a browser or browser-enabled application, such as Microsoft™ Windows™, or Linux. In some embodiments, member computing devices 602a through 602n shown may include, for example, personal computers executing a browser application program such as Microsoft Corporation's Internet Explorer™, Apple Computer, Inc.'s Safari™, Mozilla Firefox, or Opera. In some embodiments, through the member computing client devices 602a through 602n, users, 612a through 612n, may communicate over the exemplary network 606 with each other or with other systems or devices coupled to the network 606. As shown in FIG. 6, exemplary server devices 604 and 613 may be also coupled to the network 606. In some embodiments, one or more member computing devices 602a through 602n may be mobile clients.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, or retrieval of data in the respective database. In some embodiments, the exemplary DBMS-managed database may be specifically programmed to provide the ability to query, backup and replicate, enforce rules, provide security, compute, perform change and access logging, or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, or objects. In some embodiments, the exemplary DBMS-managed database may be specifically programmed to include metadata about the data that is stored.

Figure 7:
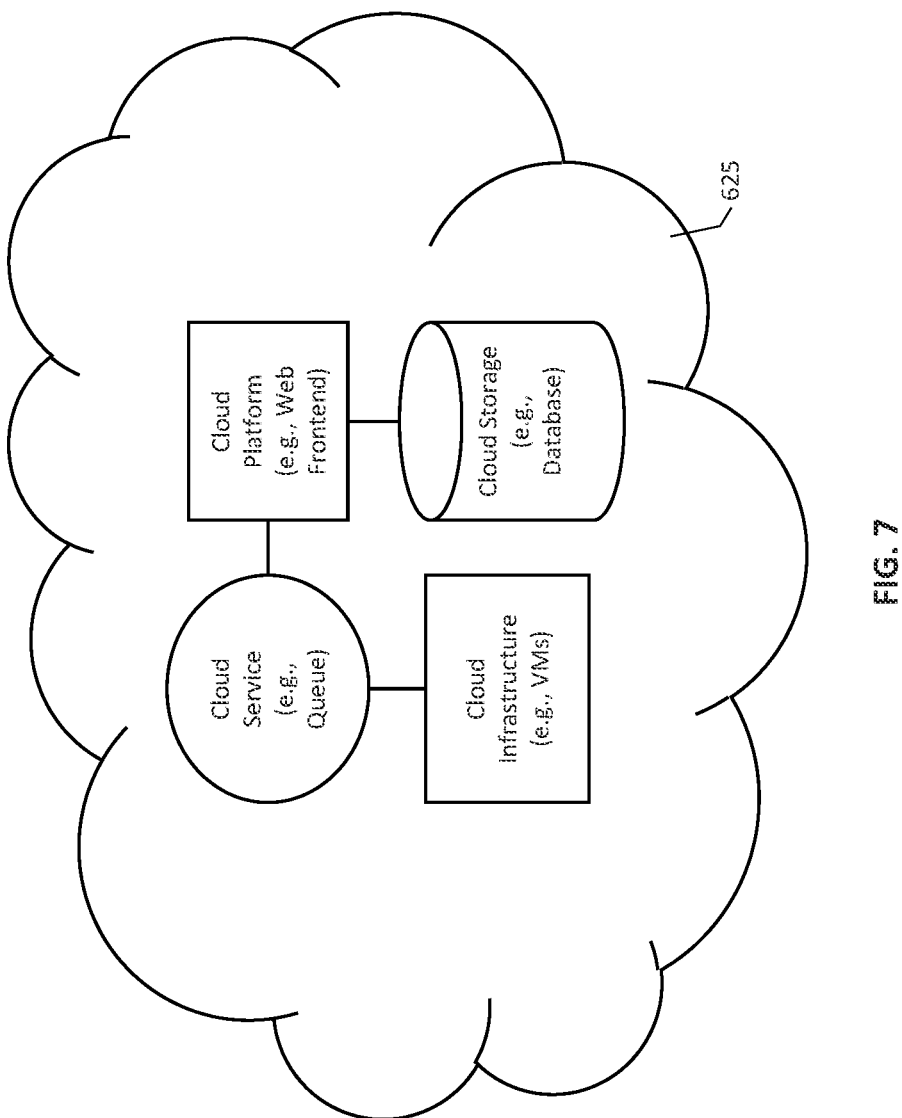
Figure 8:
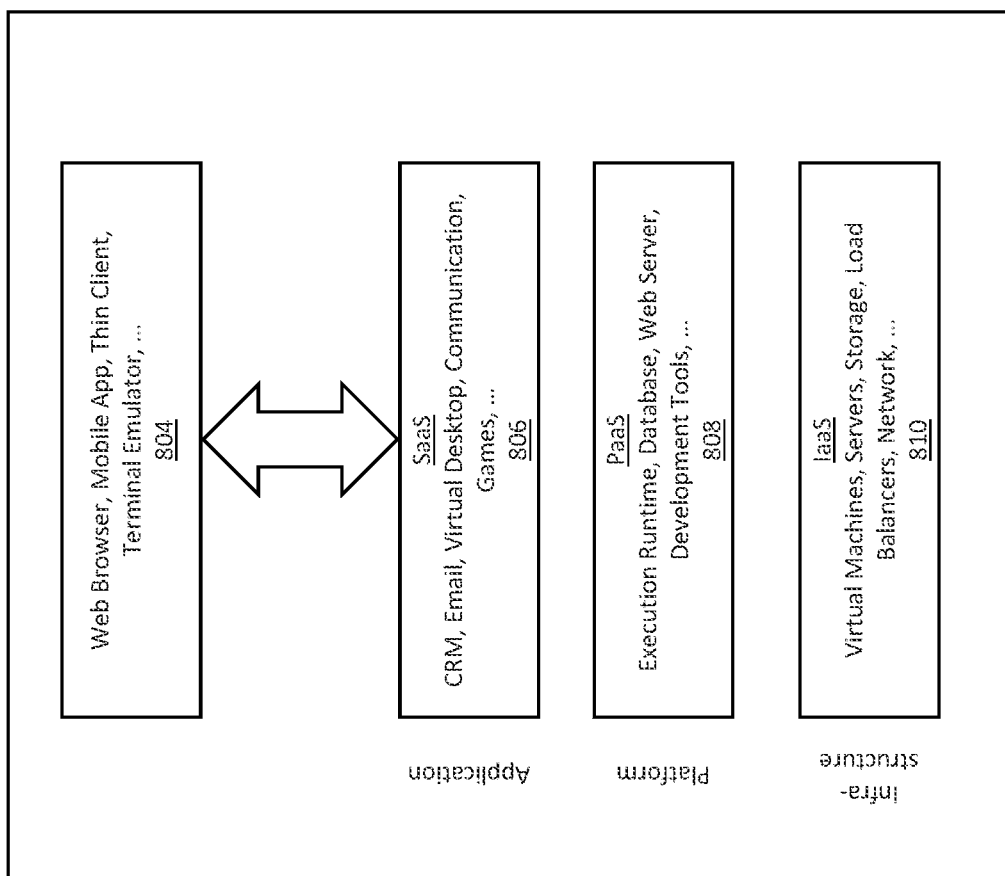

In some embodiments, the exemplary inventive computer-based systems/platforms, the exemplary inventive computer-based devices, or the exemplary inventive computer-based components of the present disclosure may be specifically configured to operate in a cloud computing/architecture such as, but not limiting to: infrastructure a service (IaaS), platform as a service (PaaS), or software as a service (SaaS). FIGS. 7 and 8 illustrate schematics of exemplary implementations of the cloud computing/architecture(s) in which the exemplary inventive computer-based systems/platforms, the exemplary inventive computer-based devices, or the exemplary inventive computer-based components of the present disclosure may be specifically configured to operate.

At least some aspects of the present disclosure will now be described with reference to the following numbered clauses.

1. A method comprising:
accessing, by at least one processor, a plurality of electronic messages residing in an electronic inbox associated with a recipient, wherein the plurality of electronic messages are associated with at least one sender;
utilizing, by the at least one processor, a message prioritization machine learning model to predict a current prioritized ordering of the plurality of electronic messages based at least in part on a plurality of parameters associated with each of the plurality of electronic messages;
wherein the plurality of parameters comprise:
i) at least one calendar event parameter that represents a calendar event associated with a respective electronic message,
ii) at least one personnel parameter associated with the sender of the respective electronic message, and
iii) at least one message subject parameter associated with a subject of the respective electronic message;
wherein the current prioritized ordering comprises an order of notification of each electronic message of the at least one electronic message according to a message priority of each electronic message at a current time;

wherein the message priority of each respective electronic message of the at least one electronic message is based on an interaction history associated with historical electronic messages associated with each respective sender; and
causing to display, by the at least one processor, the plurality of electronic messages according to the current prioritized ordering on a screen of at least one computing device associated with the recipient.

2. The method of clause 1, wherein the interaction history comprises:
i) view data representing a time between receiving and opening each historical electronic message of the historical electronic messages associated with the sender; and
ii) a response data representing a time between opening and transmitting a response to each historical electronic message of the historical electronic messages associated with the sender.

3. The method of clause 1, wherein the message prioritization machine learning model is trained according to the interaction history to correlate a respective message priority with a respective plurality of parameters associated with each respective historical electronic message of the historical electronic messages based on the interaction history associated with each respective historical electronic message.

4. The method of clause 1, wherein the at least one personnel parameter comprises a hierarchical position data representing a hierarchical position of the sender within an organization based on a hierarchical organization data.

5. The method of clause 1, further comprising utilizing, by the at least one processor, a text recognition model to determine the at least one message subject parameter of the respective electronic message based on a text string associated with the subject of the respective electronic message.

6. The method of clause 1, wherein the at least one calendar event parameter of the respective electronic message comprises a temporal proximity of the display of each respective at least one electronic message to the calendar event associated with the respective electronic message.

7. The method of clause 6, wherein the current prioritized ordering of each respective at least one electronic message dynamically adjusts based on the temporal proximity of each respective calendar event.

8. The method of clause 1, further comprising utilizing, by the at least one processor, the message prioritization machine learning model to predict an updated prioritized ordering of the at least one electronic message based on one or more user interactions associated with the at least one electronic message.

9. The method of clause 8, wherein:
the one or more user interactions comprises a read indication associated with one or more electronic messages of the at least one electronic messages; and
the read indication represents that the recipient has read the one or more electronic messages.

10. The method of clause 8, wherein the updated prioritized ordering is predicted upon each user interaction of the one or more user interactions.

11. A method comprising:
receiving, by at least one processor, a plurality of electronic messages residing in an electronic inbox associated with a recipient, wherein the plurality of electronic messages are associated with at least one sender;
generating, by the at least one processor, a set of message data associated with each of the plurality of electronic messages;
wherein each respective set of message data comprises:
i) at least one sender indicator representing the respective sender of each respective at least one electronic message, and
ii) at least one message subject indicator representing a respective subject of each respective at least one electronic message;
transmitting, by the at least one processor, each respective set of message data to a message prioritization system;
wherein the message prioritization system comprises at least one message prioritization processor configured to:
utilize a message prioritization machine learning model to predict a current prioritized ordering of the plurality of electronic messages based at least in part on a plurality of parameters associated with each of the each of the plurality of electronic messages;
wherein the plurality of parameters comprise:
i) at least one calendar event parameter that represents a calendar event associated with a respective electronic message,
ii) at least one personnel parameter associated with the at least one sender indicator of each respective electronic message, and
iii) at least one message subject parameter associated with the at least one message subject indicator of each respective electronic message;
wherein the current prioritized ordering comprises an order of notification of each electronic message of the plurality of electronic messages according to a message priority of each electronic message at a current time;
wherein the message priority of each respective electronic message of the plurality of electronic messages is based on an interaction history associated with historical electronic messages associated with each respective sender; and
transmit the current prioritized ordering to the at least one processor; and
causing to display, by the at least one processor, the plurality of electronic messages according to the current prioritized ordering on a screen in communication with the at least one processor.

12. The method of clause 11, wherein the interaction history comprises:
i) view data representing a time between receiving and opening each historical electronic message of the historical electronic messages associated with the sender; and
ii) a response data representing a time between opening and transmitting a response to each historical electronic message of the historical electronic messages associated with the sender.

13. The method of clause 11, wherein the message prioritization machine learning model is trained according to the interaction history to correlate a respective message priority with a respective plurality of parameters associated with each respective historical electronic message of the historical electronic messages based on the interaction history associated with each respective historical electronic message.

14. The method of clause 11, wherein the at least one personnel parameter comprises a hierarchical position data representing a hierarchical position of the sender within an organization based on a hierarchical organization data.

15. The method of clause 11, wherein the at least one message prioritization processor is further configured to utilize a text recognition model to determine the at least one message subject parameter of the respective electronic message based on a text string associated with the at least one subject indicator of the respective electronic message.

16. The method of clause 11, wherein the at least one calendar event parameter of the respective electronic message comprises a temporal proximity of the display of each respective at least one electronic message to the calendar event associated with the respective electronic message.

17. The method of clause 16, wherein the current prioritized ordering of each respective electronic message of the plurality of electronic messages dynamically adjusts based on the temporal proximity of each respective calendar event.

18. The method of clause 11, wherein the at least one message prioritization processor is further configured to utilize the message prioritization machine learning model to predict an updated prioritized ordering of the plurality of electronic messages based on one or more user interactions associated with the at least one electronic message.

19. The method of clause 18, wherein:
the one or more user interactions comprises a read indication associated with one or more electronic messages of the at least one electronic messages; and
the read indication represents that the recipient has read the one or more electronic messages.

20. A system comprising:
a non-transitory computer-readable memory having instructions stored thereon; and
at least one processor in communication with the non-transitory computer-readable memory and configured to perform the instructions comprising:
access a plurality of electronic messages residing in an electronic inbox associated with a recipient, wherein the plurality of electronic messages are associated with at least one sender;
utilize a message prioritization machine learning model to predict a current prioritized ordering of the plurality of electronic messages based at least in part on a plurality of parameters associated with each of the plurality of electronic messages;
wherein the plurality of parameters comprise:
i) at least one calendar event parameter that represents a calendar event associated with a respective electronic message,
ii) at least one personnel parameter associated with the sender of the respective electronic message, and
iii) at least one message subject parameter associated with a subject of the respective electronic message;
wherein the current prioritized ordering comprises an order of notification of each electronic message of the at least one electronic message according to a message priority of each electronic message at a current time;
wherein the message priority of each respective electronic message of the at least one electronic message is based on an interaction history associated with historical electronic messages associated with each respective sender; and
cause to display the plurality of electronic messages according to the current prioritized ordering on a screen of at least one computing device associated with the recipient.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical or linguistic relatives or derivatives, mean that certain events or actions can be triggered or occur without any human intervention. In some embodiments, events or actions in accordance with the present disclosure can be in real-time or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component or a combination of at least one software component and at least one hardware component which are designed/programmed/configured to manage/control other software or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware or computing software languages (e.g., C++, Objective-C, Swift, Java, JavaScript, Python, Perl, QT, etc.).

In some embodiments, one or more of exemplary inventive computer-based systems of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), wearable device, mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems of the present disclosure may obtain, manipulate, transfer, store, transform, generate, or output any digital object or data unit (e.g., from inside or outside of a particular application) that can be in any suitable form such as, without limitation, a file, a contact, a task, an email, a tweet, a map, an entire application (e.g., a calculator), etc.

In some embodiments, exemplary inventive computer-based systems of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, exemplary inventive computer-based systems of the present disclosure may be configured to be utilized in various applications which may include, but not limited to, gaming, mobile-device games, video chats, video conferences, live video streaming, video streaming or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, or the exemplary inventive computer-based components of the present disclosure may be configured to securely store or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added or any desired steps may be eliminated).

The invention claimed is:
1. A method comprising:
accessing, by at least one processor, a plurality of electronic messages of an electronic messaging software application associated with a recipient, wherein the plurality of electronic messages are associated with at least one sender and a subject;
accessing, by the at least one processor, a plurality of calendar events residing in an electronic calendar associated with the recipient, wherein the plurality of calendar events are associated with at least one invitee and at least one event subject;
determining, by the at least one processor, at least one calendar event of the plurality of calendar events associated with at least one electronic message of the plurality of electronic messages based at least in part on a matching of:

the at least one sender with the at least one invitee, and the subject with the at least one event subject;

utilizing, by the at least one processor, a message prioritization machine learning model to predict a current prioritized ordering of the plurality of electronic messages based at least in part on at least one parameter associated with each of the plurality of electronic messages;

wherein the at least one parameter comprises at least one calendar event parameter that represents a calendar event of the at least one calendar event associated with a respective electronic message, wherein the current prioritized ordering comprises an order of notification of each electronic message of the at least one electronic message according to a message priority of each electronic message at a current time; and causing to display, by the at least one processor, the plurality of electronic messages according to the current prioritized ordering on a screen of at least one computing device associated with the recipient.

2. The method of claim 1, wherein the message priority of each respective electronic message of the at least one electronic message is based on an interaction history associated with historical electronic messages associated with each respective sender; and wherein the interaction history comprises:
i) view data representing a time between receiving and opening each historical electronic message of the historical electronic messages associated with the at least one sender; and
ii) a response data representing a time between opening and transmitting a response to each historical electronic message of the historical electronic messages associated with the at least one sender.

3. The method of claim 1, wherein the message prioritization machine learning model is trained according to an interaction history to correlate a respective message priority with a respective at least one parameter associated with each respective historical electronic message of the historical electronic messages based on the interaction history associated with each respective historical electronic message.

4. The method of claim 1, wherein the at least one parameter comprises at least one personnel parameter comprises a hierarchical position data representing a hierarchical position of the at least one sender within an organization based on a hierarchical organization data.

5. The method of claim 1, further comprising utilizing, by the at least one processor, a text recognition model to determine the at least one message subject parameter of the respective electronic message based on a text string associated with the subject of the respective electronic message.

6. The method of claim 1, wherein the at least one calendar event parameter of the respective electronic message comprises a temporal proximity of the display of each respective at least one electronic message to the calendar event associated with the respective electronic message.

7. The method of claim 6, wherein the current prioritized ordering of each respective at least one electronic message dynamically adjusts based on the temporal proximity of each respective calendar event.

8. The method of claim 1, further comprising utilizing, by the at least one processor, the message prioritization machine learning model to predict an updated prioritized ordering of the at least one electronic message based on one or more user interactions associated with the at least one electronic message.

9. The method of claim 8, wherein:
the one or more user interactions comprises a read indication associated with one or more electronic messages of the at least one electronic messages; and
the read indication represents that the recipient has read the one or more electronic messages.

10. The method of claim 8, wherein the updated prioritized ordering is predicted upon each user interaction of the one or more user interactions.

11. A method comprising:
receiving, by at least one processor, a plurality of electronic messages of an electronic messaging software application associated with a recipient, wherein the plurality of electronic messages are associated with at least one sender and a subject;

generating, by the at least one processor, a set of message data associated with each of the plurality of electronic messages;

wherein each respective set of message data comprises:
i) at least one sender indicator representing the at least one sender of each respective at least one electronic message, and
ii) at least one message subject indicator representing a respective subject of each respective at least one electronic message;

receiving, by at least one processor, a plurality of calendar events residing in an electronic calendar associated with the recipient, wherein the plurality of calendar events are associated with at least one invitee and at least one event subject;

determining, by the at least one processor, at least one calendar event of the plurality of calendar events associated with at least one electronic message of the plurality of electronic messages based at least in part on a matching of:
the at least one sender with the at least one invitee, and
the subject with the at least one event subject;

transmitting, by the at least one processor, each respective set of message data and the at least one calendar event to a message prioritization system;

wherein the message prioritization system comprises at least one message prioritization processor configured to:
utilize a message prioritization machine learning model to predict a current prioritized ordering of the plurality of electronic messages based at least in part on a at least one parameter associated with each of the plurality of electronic messages;

wherein the at least one parameter comprises at least one calendar event parameter that represents a calendar event of the at least one calendar event associated with a respective electronic message, wherein the current prioritized ordering comprises an order of notification of each electronic message of the plurality of electronic messages according to a message priority of each electronic message at a current time; and transmit the current prioritized ordering to the at least one processor; and causing to display, by the at least one processor, the plurality of electronic messages according to the current prioritized ordering on a screen in communication with the at least one processor.

12. The method of claim 11, wherein the message priority of each respective electronic message of the at least one electronic message is based on an interaction history associated with historical electronic messages associated with each respective sender; and wherein the interaction history comprises:
i) view data representing a time between receiving and opening each historical electronic message of the historical electronic messages associated with the at least one sender; and
ii) a response data representing a time between opening and transmitting a response to each historical electronic message of the historical electronic messages associated with the at least one sender.

13. The method of claim 11, wherein the message prioritization machine learning model is trained according to an interaction history to correlate a respective message priority with a respective at least one parameter associated with each respective historical electronic message of the historical electronic messages based on the interaction history associated with each respective historical electronic message.

14. The method of claim 11, wherein the at least one parameter comprises at least one personnel parameter comprises a hierarchical position data representing a hierarchical position of the at least one sender within an organization based on a hierarchical organization data.

15. The method of claim 11, wherein the at least one message prioritization processor is further configured to utilize a text recognition model to determine the at least one message subject parameter of the respective electronic message based on a text string associated with the at least one subject indicator of the respective electronic message.

16. The method of claim 11, wherein the at least one calendar event parameter of the respective electronic message comprises a temporal proximity of the display of each respective at least one electronic message to the calendar event associated with the respective electronic message.

17. The method of claim 16, wherein the current prioritized ordering of each respective electronic message of the plurality of electronic messages dynamically adjusts based on the temporal proximity of each respective calendar event.

18. The method of claim 11, wherein the at least one message prioritization processor is further configured to utilize the message prioritization machine learning model to predict an updated prioritized ordering of the plurality of electronic messages based on one or more user interactions associated with the at least one electronic message.

19. The method of claim 18, wherein:
the one or more user interactions comprises a read indication associated with one or more electronic messages of the at least one electronic messages; and
the read indication represents that the recipient has read the one or more electronic messages.

20. A system comprising:
a non-transitory computer-readable memory having instructions stored thereon; and
at least one processor in communication with the non-transitory computer-readable memory and configured to perform the instructions comprising:
access a plurality of electronic messages of an electronic messaging software application associated with a recipient, wherein the plurality of electronic messages are associated with at least one sender and subject;
access a plurality of calendar events residing in an electronic calendar associated with the recipient, wherein the plurality of calendar events are associated with at least one invitee and at least one event subject;
determine at least one calendar event of the plurality of calendar events associated with at least one electronic message of the plurality of electronic messages based at least in part on a matching of:
the at least one sender with the at least one invitee, and
the subject with the at least one event subject;
utilize a message prioritization machine learning model to predict a current prioritized ordering of the plurality of electronic messages based at least in part on a at least one parameter associated with each of the plurality of electronic messages;
wherein the at least one parameter comprises at least one calendar event parameter that represents a calendar event of the at least one calendar event associated with a respective electronic message,
wherein the current prioritized ordering comprises an order of notification of each electronic message of the at least one electronic message according to a message priority of each electronic message at a current time; and
cause to display the plurality of electronic messages according to the current prioritized ordering on a screen of at least one computing device associated with the recipient.

\* \* \* \* \*